US012547575B2

(12) United States Patent
Kelly et al.

(10) Patent No.: US 12,547,575 B2
(45) Date of Patent: Feb. 10, 2026

(54) PROGRAMMING-ENHANCED BASEBOARD MANAGEMENT CONTROLLER

(71) Applicant: Microsoft Technology Licensing, LLC, Redmond, WA (US)

(72) Inventors: Bryan David Kelly, Carnation, WA (US); Peishan Huang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/405,959

(22) Filed: Jan. 5, 2024

(65) Prior Publication Data
US 2025/0156361 A1    May 15, 2025

Related U.S. Application Data

(60) Provisional application No. 63/597,680, filed on Nov. 9, 2023.

(51) Int. Cl.
G06F 13/00    (2006.01)
G06F 13/42    (2006.01)
(52) U.S. Cl.
CPC ............................... *G06F 13/4221* (2013.01)
(58) Field of Classification Search
CPC ......... G06F 13/4221; G06F 2213/0016; G06F 11/2268
See application file for complete search history.

(56) References Cited

U.S. PATENT DOCUMENTS

2018/0074984 A1    3/2018  Olarig
2021/0064491 A1*   3/2021  Chang ..................... G06F 11/10
(Continued)

FOREIGN PATENT DOCUMENTS

CN    104050006      *  9/2014   ............ G06F 9/445
CN    104050006 A       9/2014
CN    110764585 A       2/2020

OTHER PUBLICATIONS

Oluyemi, Tope., "Open source DC-SCM compatible BMC hardware platform", Retrieved From: https://www.electronics-lab.com/open-source-dc-scm-compatible-bmc-hardware-platform/, Jul. 28, 2021, 5 Pages.
(Continued)

Primary Examiner — Henry Tsai
Assistant Examiner — Kim T Huynh
(74) Attorney, Agent, or Firm — Wade IP Law PLLC

(57) ABSTRACT

Techniques are described herein in which a programmable logic device (PLD) is integrated into a baseboard management controller (BMC). A programming-enhanced BMC is powered on by a PLD that is integrated into the programming-enhanced BMC and that is coupled to an internal bus of the programming-enhanced BMC. A configuration file is provided from immutable BMC hardware in the BMC to the PLD based at least on the programming-enhanced BMC being powered on. The configuration file specifies a configuration to be programmatically applied to programmable hardware of the PLD. The programmable hardware of the PLD is programmed by loading the configuration file, which causes the programmable hardware to render a peripheral interface that is defined by the configuration file natively on the internal bus of the programming-enhanced BMC.

20 Claims, 5 Drawing Sheets

(56) References Cited

U.S. PATENT DOCUMENTS

2021/0263727 A1 8/2021 Chen
2022/0147340 A1* 5/2022 Chang .................... G06F 8/65
2022/0398105 A1 12/2022 Lambert
2025/0156361 A1* 5/2025 Kelly ................ G06F 13/4221

OTHER PUBLICATIONS

International Search Report and Written Opinion received for PCT Application No. PCT/US2024/051680, Jan. 7, 2025, 13 pages.

\* cited by examiner

PROGRAMMING-ENHANCED BASEBOARD MANAGEMENT CONTROLLER

CROSS-REFERENCE TO RELATED APPLICATION(S)

This application claims the benefit of U.S. Provisional Application No. 63/597,680, filed Nov. 9, 2023 and entitled "Programming-Enhanced Baseboard Management Controller," the entirety of which is incorporated herein by reference.

BACKGROUND

A baseboard management controller (BMC) often is implemented as a discrete component on a motherboard of a computing device, such as a server, to perform system management operations with regard to the computing device. For example, the BMC can monitor parameters of components (a.k.a. "monitored components") that are included in the computing device and provide an alert to a user (e.g., a system administrator) if a parameter goes beyond an established boundary. Examples of such a parameter include temperature, cooling fan speed, power status, and operating system (OS) status.

A complex programmable logic device (CPLD) or a field-programmable gate array (FPGA) typically is implemented as another discrete component on the motherboard of the computing device to convert signals from a protocol associated with the BMC to protocols associated with the motherboard and the monitored components. Converting the signals in this manner consumes a substantial amount of time and resources.

Traditional discrete BMCs and CPLDs/FPGAs have relatively complex interdependencies. For instance, the CPLD/FPGA relies on the BMC for updates and recovery, and the BMC relies on the CPLD/FPGA to power on the BMC and to perform the aforementioned protocol conversions. The BMC and the CPLD/FPGA traditionally exhibit incompatible recovery mechanisms, which creates a vulnerability in the computing device. Moreover, implementing the BMC and the CPLD/FPGA as separate discrete components results in a relatively high packaging cost and a relatively large footprint on the motherboard.

SUMMARY

It may be desirable to integrate a programmable logic device (PLD) into a BMC. A PLD is an electronic component that is used to build a reconfigurable circuit (e.g., a reconfigurable digital circuit). For example, the PLD may have undefined functionality at the time of manufacture, and the PLD subsequently may be programmed to have a desired functionality, which enables the PLD to be used in a circuit. In accordance with this example, programming the PLD may change connections between gates in the PLD to achieve the desired functionality. Examples of a PLD include but are not limited to a simple programmable logic device (SPLD), a complex programmable logic device (CPLD), and a field-programmable gate array (FPGA). Examples of a SPLD include but are not limited to programmable array logic (PAL), a programmable logic array (PLA), and generic array logic (GAL). By integrating the PLD into the BMC, conversion of signals from a protocol of the BMC to a protocol of the motherboard on which the BMC is implemented and to protocols of components that are monitored by the BMC may be avoided. Integrating the PLD into the BMC enables the PLD to power-on the BMC, even if an image of the PLD (e.g., a configuration file that defines a configuration of the PLD) is corrupt or non-existent.

Various approaches are described herein for, among other things, integrating a PLD into a BMC. Integrating the PLD into the BMC enables the PLD to render a programmed peripheral interface natively on an internal bus of the BMC. A programmed peripheral interface is a peripheral interface that is created by programming programmable hardware. In an aspect, the PLD programs its programmable hardware to provide the programmed peripheral interface. A peripheral interface is an interface that enables an interaction (e.g., communication) with a peripheral device. In an aspect, the peripheral interface generated by the PLD enables the BMC to communicate with the peripheral device. A peripheral device is a device that is external to the BMC. Examples of a peripheral device include but are not limited to a sensor, a cooling fan, memory, a power supply unit (PSU), a processing system, an input/output (I/O) device, a root of trust, a chassis manager, and a rack manager. Examples of a sensor include but are not limited to a thermometer, an accelerometer, a velocity sensor, a displacement sensor, and a pressure sensor. Examples of a memory include but are not limited to a flash memory and a solid-state drive (SSD). Examples of a processing system include but are not limited to a central processing unit (CPU) and a graphical processing unit (GPU). Examples of an I/O device include but are not limited to a printed circuit assembly (PCA) and a network interface controller (NIC). A root of trust is an authoritative entity for which trust is assumed and not derived. A chassis manager is a system that manages resources in a computer chassis. A computer chassis is a physical computer case in which hardware components of a computer are stored. A rack manager is a system that manages a computer rack. A computer rack is a physical structure on which multiple computer chassis are capable of being mounted simultaneously.

In a first example approach, a programming-enhanced baseboard management controller (BMC) includes immutable BMC hardware, an internal bus, and a programmable logic device (PLD). The immutable BMC hardware is configured to perform a system management operation with regard to a peripheral device that is external to the programming-enhanced BMC. The PLD is coupled to the internal bus. The PLD is configured to power on the programming-enhanced BMC. The immutable BMC hardware is configured to provide a configuration file to the PLD based at least on the programming-enhanced BMC being powered on. The configuration file specifies a configuration to be programmatically applied to programmable hardware of the PLD. The PLD is further configured to program the programmable hardware of the PLD by loading the configuration file, which causes the programmable hardware to render a peripheral interface that is defined by the configuration file natively on the internal bus of the programming-enhanced BMC.

In a second example approach, a programming-enhanced BMC is powered on by a PLD that is integrated into the programming-enhanced BMC and that is coupled to an internal bus of the programming-enhanced BMC. A configuration file is provided from immutable BMC hardware in the BMC to the PLD based at least on the programming-enhanced BMC being powered on. The configuration file specifies a configuration to be programmatically applied to programmable hardware of the PLD. The programmable hardware of the PLD is programmed by loading the configuration file, which causes the programmable hardware to render a peripheral interface that is defined by the configuration file natively on the internal bus of the programming-enhanced BMC.

In a third example approach, a computing system includes memory, a processing system coupled to the memory, and a programming-enhanced BMC. The programming-enhanced BMC includes an internal bus, an immutable peripheral interface coupled to the internal bus, immutable BMC hardware, and a PLD coupled to the internal bus. The immutable BMC hardware is configured to perform a system management operation with regard to a peripheral device, which includes the memory or the processing system, by providing packets to the peripheral device via the immutable peripheral interface. The PLD is configured to power on the programming-enhanced BMC. The PLD includes programmable hardware. The immutable BMC hardware is further configured to provide a configuration file to the PLD based at least on the programming-enhanced BMC being powered on. The configuration file specifies a configuration to be programmatically applied to the programmable hardware of the PLD. The PLD is further configured to provide a programmed peripheral interface natively on the internal bus of the programming-enhanced BMC by programming the programmable hardware of the PLD using the configuration file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
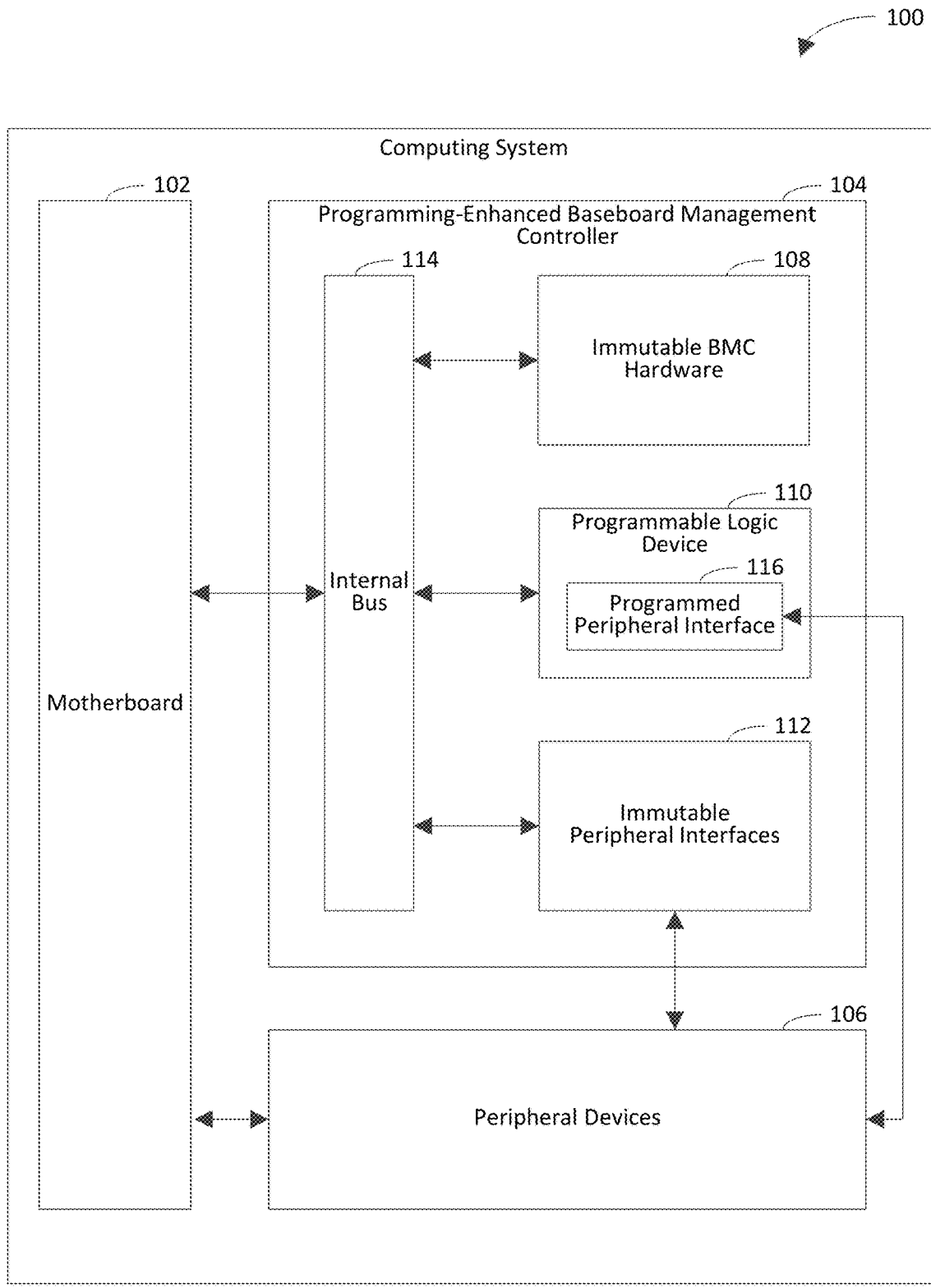
FIG. 1 is a block diagram of an example computing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to integrate a programmable logic device (PLD) into a BMC. A PLD is an electronic component that is used to build a reconfigurable circuit (e.g., a reconfigurable digital circuit). For example, the PLD may have undefined functionality at the time of manufacture, and the PLD subsequently may be programmed to have a desired functionality, which enables the PLD to be used in a circuit. In accordance with this example, programming the PLD may change connections between gates in the PLD to achieve the desired functionality. Examples of a PLD include but are not limited to a simple programmable logic device (SPLD), a complex programmable logic device (CPLD), and a field-programmable gate array (FPGA). Examples of a SPLD include but are not limited to programmable array logic (PAL), a programmable logic array (PLA), and generic array logic (GAL). By integrating the PLD into the BMC, conversion of signals from a protocol of the BMC to a protocol of the motherboard on which the BMC is implemented and to protocols of components that are monitored by the BMC may be avoided. Integrating the PLD into the BMC enables the PLD to power-on the BMC, even if an image of the PLD (e.g., a configuration file that defines a configuration of the PLD) is corrupt or non-existent.

Example embodiments described herein are capable of integrating a PLD into a BMC. Integrating the PLD into the BMC enables the PLD to render a programmed peripheral interface natively on an internal bus of the BMC. A programmed peripheral interface is a peripheral interface that is created by programming programmable hardware. In an aspect, the PLD programs its programmable hardware to provide the programmed peripheral interface. A peripheral interface is an interface that enables an interaction (e.g., communication) with a peripheral device. In an aspect, the peripheral interface generated by the PLD enables the BMC to communicate with the peripheral device. A peripheral device is a device that is external to the BMC. Examples of a peripheral device include but are not limited to a sensor, a cooling fan, memory, a power supply unit (PSU), a processing system, an input/output (I/O) device, a root of trust, a chassis manager, and a rack manager. Examples of a sensor include but are not limited to a thermometer, an accelerometer, a velocity sensor, a displacement sensor, and a pressure sensor. Examples of a memory include but are not limited to a flash memory and a solid-state drive (SSD). Examples of a processing system include but are not limited to a central processing unit (CPU) and a graphical processing unit (GPU). Examples of an I/O device include but are not limited to a printed circuit assembly (PCA) and a network interface controller (NIC). A root of trust is an authoritative entity for which trust is assumed and not derived. A chassis manager is a system that manages resources in a computer chassis. A computer chassis is a physical computer case in which hardware components of a computer are stored. A rack manager is a system that manages a computer rack. A computer rack is a physical structure on which multiple computer chassis are capable of being mounted simultaneously.

Example techniques described herein have a variety of benefits as compared to conventional system management techniques, which utilize separate, discrete BMCs and CPLDs/FPGAs on a motherboard. For instance, the example techniques are capable of obviating a need to convert signals from a protocol of the BMC to protocols of the motherboard and components that are monitored by the BMC. The example techniques are capable of increasing security of a computing device that includes a BMC, for example, by utilizing a common recovery mechanism for the BMC and a PLD that is integrated into the BMC. The example techniques may reduce a cost of the computing device by incorporating the PLD into the BMC. For instance, incorporating the PLD into the BMC may reduce a packaging cost associated with the computing device, for example, by eliminating the packaging cost associated with packaging the PLD separately from the BMC. The example techniques are capable of reducing an amount of real estate that is consumed by the BMC and the PLD on the motherboard by integrating the PLD into the BMC. Integrating the PLD into the BMC may obviate a need to provide a flash chip and/or a PLD external to the BMC (e.g., for purposes of performing protocol conversion). Reducing the amount of real estate that is consumed on the motherboard may enable a size of the motherboard to be reduced, which may reduce a cost associated with the motherboard. For instance, integrating the PLD into the BMC may reduce the cost associated with the motherboard by more than 50 percent.

The example techniques reduce an amount of time and/or resources (e.g., processor cycles, memory) that is consumed to perform system management operations with regard to a computing device. For example, by integrating a PLD into a BMC on a motherboard of the computing device, time and resources that otherwise would be consumed to perform protocol conversion are avoided. In accordance with this example, by integrating the PLD into the BMC, signals of the BMC need not be converted from a protocol of the BMC to protocols of the motherboard and components that are monitored by the BMC in order for the system management operations to be performed. By integrating the PLD into the BMC, the time and resources that are consumed to recover the PLD or the BMC may be reduced. For instance, integrating the PLD into the BMC may enable a failure of the recovery, which would have occurred if the PLD and the BMC had been implemented as separate, discrete components, to be avoided. Moreover, the example techniques enable costs associated with protocol conversion and/or a failed recovery to be avoided. Accordingly, a cost associated with performing system management operations and/or recovery in accordance with any of the example techniques described herein may be less than a cost associated with conventional system management and recovery techniques.

By reducing the amount of time and/or resources that is consumed to perform system management and/or recovery operations, efficiency of a computing system that performs the operations is increased. By incorporating a PLD into a BMC, the example techniques improve (e.g., increase) a user experience and an efficiency of a user of the computing system that includes the BMC. For example, incorporating the PLD into the BMC enables the PLD to render a programmed peripheral interface natively on an internal bus of the BMC, which may reduce an amount of time consumed and effort spent by the user with regard to system management and recovery operations.

FIG. 1 is a block diagram of an example computing system 100 in accordance with an embodiment. A computing system is a system that includes a processing system comprising at least one processor that is capable of manipulating data in accordance with a set of instructions. For instance, a computing system may be a server computer, a desktop computer, a laptop computer, a tablet computer, a wearable computer such as a smart watch or a head-mounted computer, a personal digital assistant, a cellular telephone, an Internet of things (IoT) device, or the like. As shown in FIG. 1, the computing system 100 includes a motherboard 102, a programming-enhanced baseboard management controller (BMC) 104, and peripheral devices 106. In an aspect, the programming-enhanced BMC 104 is embedded in the motherboard 102. The motherboard 102 includes a processing system that is capable of communicating with the programming-enhanced BMC 104 and the peripheral devices 106. A motherboard (e.g., motherboard 102) is a printed circuit board (PCB) that has a capability of expansion, meaning that the motherboard includes an expansion interface (e.g., slot) into which another circuit board may be provided (e.g., inserted). A PCB is a circuit that provides electrical connections between electronic components (e.g., the peripheral devices 106) that are attached to the PCB. The peripheral devices 106 are attached to the motherboard 102. The peripheral devices 106 include any one or more suitable types of devices. For example, the peripheral devices 106 may include a sensor, a cooling fan, memory, a power supply unit (PSU), a processing system, and/or an input/output (I/O) device.

The programming-enhanced BMC 104 includes immutable BMC hardware 108, a programmable logic device (PLD) 110, immutable peripheral interfaces 112, and an internal bus 114. A programming-enhanced BMC is a BMC that includes a PLD coupled to an internal bus of the BMC. The immutable BMC hardware 108 is configured to perform system management operations with regard to the peripheral devices 106. In an aspect, the immutable BMC hardware 108 performs the system management operations out-of-band, meaning that the immutable BMC hardware 108 is configured to perform the system management operations regardless whether the computing system 100 is powered on, regardless whether an operating system (OS) is installed on the computing system 100, and regardless whether an OS that is installed on the computing system 100 is functional. For instance, the immutable BMC hardware 108 may perform the system management operations out-of-band by communicating with the peripheral devices 106 via (e.g., directly via) peripheral interfaces (e.g., a programmed peripheral interface 116 and the immutable peripheral interfaces 112) in the programming-enhanced BMC 104 (e.g., rather than via the motherboard 102). The programmed peripheral interface 116 is discussed in greater detail below. In another aspect, the immutable BMC hardware 108 performs the system management operations by providing packets to the peripheral devices 106 via the programmed peripheral interface 116 and the immutable peripheral interfaces 112. In an example implementation, the peripheral devices 106 include one or more components (e.g., memory and/or a processing system) that are incorporated into the motherboard 102. Accordingly, the peripheral devices 106 need not necessarily be external to the motherboard 102, though the peripheral devices 106 are external to the programming-enhanced BMC 104. The immutable BMC hardware 108 is further configured to provide a configuration file to the PLD 110 based at least on the programming-enhanced BMC 104 being powered on. The configuration file specifies a configuration to be programmatically applied to programmable hardware of the PLD 110.

The PLD 110 is coupled to the internal bus 114 and includes the programmable hardware. In an aspect, the PLD 110 (e.g., the programmable hardware therein) runs on a hardware definition language (HDL) and serves purposes at the circuit level. In accordance with this aspect, the PLD 110 performs operations with regard to any of a variety of tasks, such as power-on sequencing of the computing system 100 (e.g., any one or more components therein), initializing power rails of the computing system 100, and/or managing programming stabilization delays in the computing system 100. The PLD 110 is configured to power on the programming-enhanced BMC 104. The PLD 110 is further configured to provide a programmed peripheral interface 116 natively on the internal bus 114 by programming its programmable hardware using the configuration file, which is received from the immutable BMC hardware 108. Accordingly, the PLD 110 may cause its programmable hardware to render the programmed peripheral interface 116 natively on the internal bus 114. By rendering the programmed peripheral interface 116 natively on the internal bus 114, it is meant that the programmable hardware causes the programmed peripheral interface 116 to be rendered in manner that enables the immutable BMC hardware 108 to detect (e.g., recognize) the programmed peripheral interface 116 on the internal bus 114 similarly to a manner in which the immutable BMC hardware 108 detects the immutable peripheral interfaces 112 on the internal bus 114. In an aspect, the programmed peripheral interface 116 being programmed rather than immutable is inconsequential (e.g., irrelevant) with regard to how the immutable BMC hardware 108 interacts with the programmed peripheral interface 116.

The immutable peripheral interfaces 112 enable the immutable BMC hardware 108 to perform system management operations on the peripheral devices 106 or other devices coupled to the peripheral devices 106 by forwarding packets from the immutable BMC hardware 108 to the peripheral devices 106.

The internal bus 114 is configured to transfer information (e.g., packets) to and/or from the immutable BMC hardware 108, the PLD 110 (including programmed peripheral interface 116), and the immutable peripheral interfaces 112. In an aspect, the internal bus 114 is configured to operate in accordance with an advanced extensible interface (AXI) protocol, developed by Arm Holdings plc.

In an aspect, the programming-enhanced BMC 104 is implemented as a system-on-a-chip system (SoC). In accordance with this aspect, the SoC includes an integrated circuit chip that includes one or more of a processor (e.g., a microcontroller, microprocessor, or digital signal processor (DSP)), memory, one or more communication interfaces, and/or further circuits and/or embedded firmware to perform its functions.

In another aspect, the motherboard 102, one or more of the peripheral devices 106, the immutable BMC hardware 108, the programmable logic device 110, the immutable peripheral interfaces 112, the internal bus 114, and/or the programmed peripheral interface 116 is implemented in hardware logic/electrical circuitry. Such hardware logic/electrical circuitry may include one or more hardware logic components. Examples of a hardware logic component include an application-specific integrated circuit (ASIC), an application-specific standard product (ASSP), and a SoC.

Figure 2:
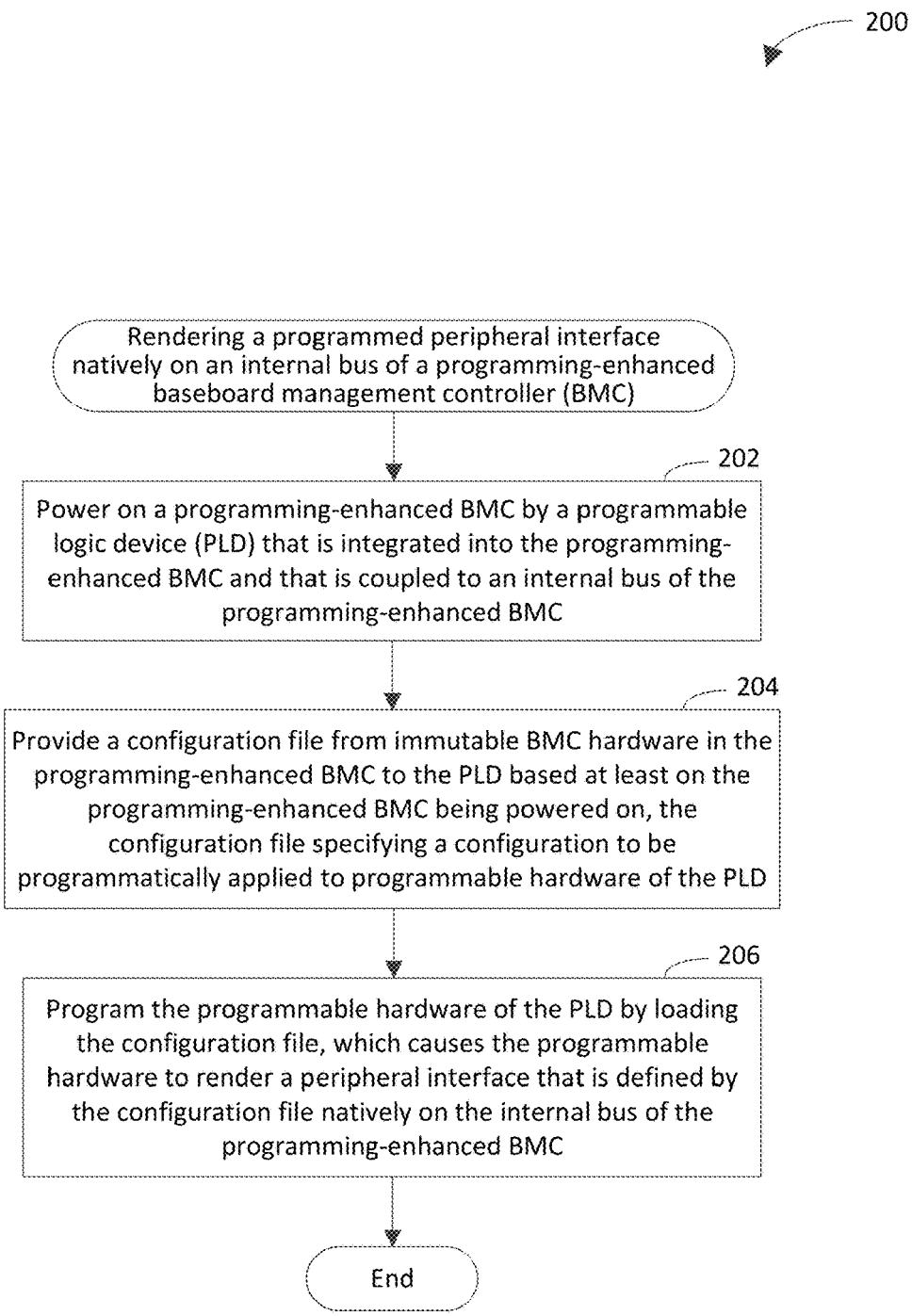
FIG. 2 depicts a flowchart of an example method for rendering a programmed peripheral interface natively on an internal bus of a programming-enhanced baseboard management controller (BMC) in accordance with an embodiment.
Figure 3:
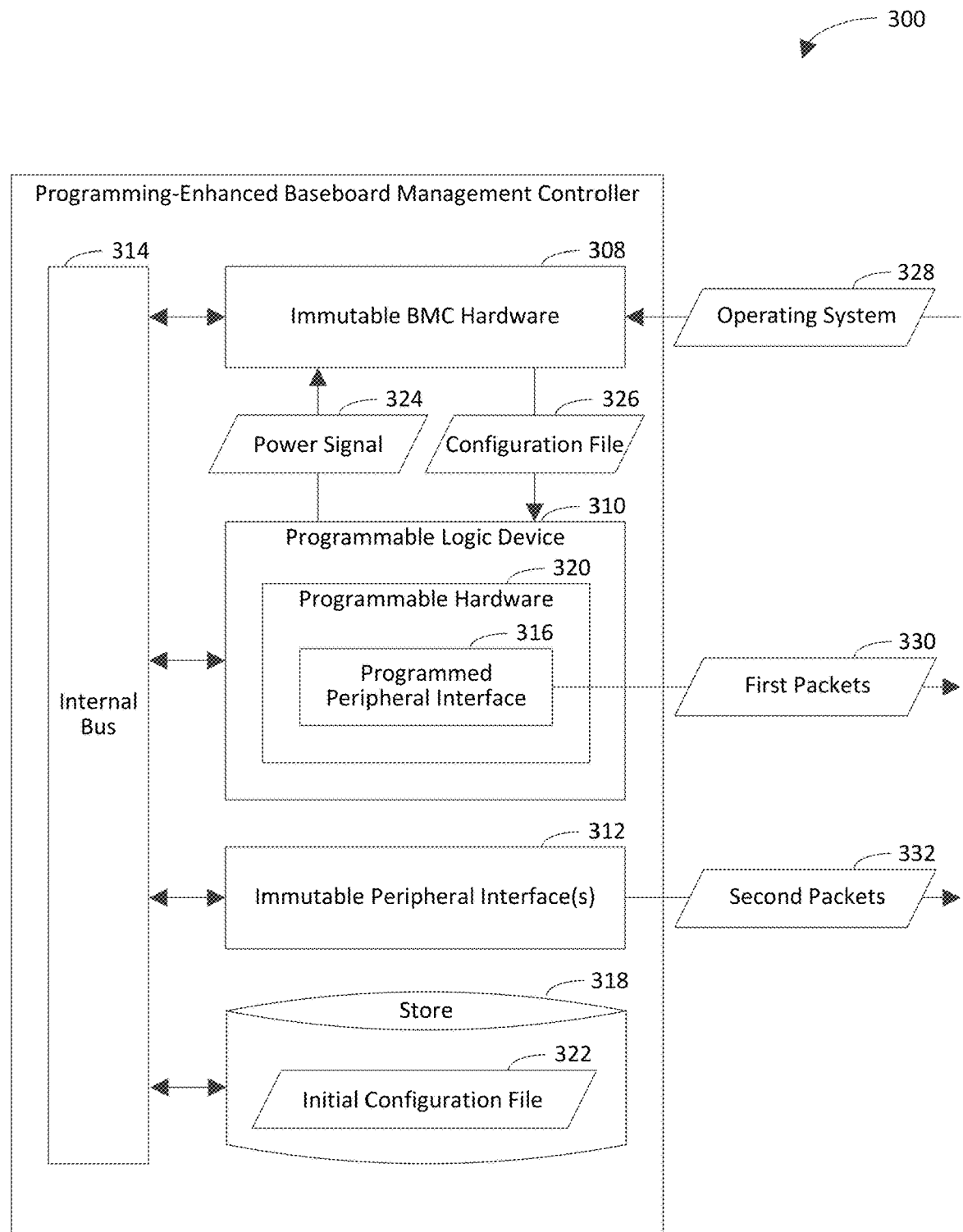
FIG. 3 is a block diagram of an example programming-enhanced BMC in accordance with an embodiment.

FIG. 2 depicts a flowchart 200 of an example method for rendering a programmed peripheral interface natively on an internal bus of a programming-enhanced baseboard management controller (BMC) in accordance with an embodiment. Flowchart 200 may be performed by the programming-enhanced BMC 104, shown in FIG. 1, for example. For illustrative purposes, flowchart 200 is described with respect to a programming-enhanced BMC 300 shown in FIG. 3, which is an example implementation of the programming-enhanced BMC 104. As shown in FIG. 3, the programming-enhanced BMC 300 includes immutable BMC hardware 308, a programmable logic device (PLD) 310, immutable peripheral interface(s) 312, an internal bus 314, and a store 318. Accordingly, the PLD 310 is integrated into the programming-enhanced BMC 300. In an aspect, the store 318 is random-access memory (RAM). The immutable BMC hardware 308, the PLD 310, the immutable peripheral interface(s) 312, and the store 318 are coupled to the internal bus 314. The PLD 310 includes programmable hardware 320. The programmable hardware 320 includes a programmed peripheral interface 316. The store 318 is shown to store an initial configuration file 322 for non-limiting, illustrative purposes. Further structural and operational embodiments will be apparent to persons skilled in the relevant art(s) based on the discussion regarding flowchart 200.

As shown in FIG. 2, the method of flowchart 200 begins at step 202. In step 202, a programming-enhanced baseboard management controller (BMC) is powered on by a programmable logic device (PLD) that is integrated into the programming-enhanced BMC and that is coupled to an internal bus of the programming-enhanced BMC. In an aspect, powering on the programming-enhanced BMC includes taking the programming-enhanced BMC out of a reset state. In accordance with this aspect, the reset state is a predetermined state that occurs after a power switch of the computing device 100 is switched from an "off" state to an "on" state and before a power supply of the programming-enhanced BMC has asserted "power good" to indicate that the power supply is ready to provide a stable voltage at a power level that is greater than or equal to a designated (e.g., predetermined) power threshold. In an example implementation, the PLD 310 powers on the programming-enhanced BMC 300. For example, the PLD 310 may power on the programming-enhanced BMC 300 by providing a power signal 324 (e.g., an electrical signal) to the immutable BMC hardware 308. In accordance with this example, the power signal 324 includes energy that activates the immutable BMC hardware 308. In an aspect, the power signal 324 enables the immutable BMC hardware 308 to operate.

In an example embodiment, powering on the programming-enhanced BMC at step 202 includes performing, by the PLD, a power-on sequence in which the PLD powers on the programming-enhanced BMC despite an initial configuration file, which defines an initial configuration that is to be applied to the PLD during the power-on sequence, being corrupted. In an example implementation, the PLD 310 performs a power-on sequence in which the PLD 310 powers on the programming-enhanced BMC 300 despite the initial configuration file 322, which defines an initial configuration that is to be applied to the PLD 310 during the power-on sequence, being corrupted.

In another example embodiment, powering on the programming-enhanced BMC at step 202 includes performing, by the PLD, a power-on sequence in which the PLD powers on the programming-enhanced BMC despite not having access to an initial configuration file that defines an initial configuration that is to be applied to the PLD during the power-on sequence. In an example implementation, the PLD 310 performs a power-on sequence in which the PLD 310 powers on the programming-enhanced BMC 300 despite not having access to the initial configuration file 322, which defines an initial configuration that is to be applied to the PLD 310 during the power-on sequence. In an aspect, the initial configuration file 322 does not exist. In accordance with this aspect, the store 318 does not store the initial configuration file 322. In further accordance with this aspect, the PLD 310 performs the power-on sequence even though the initial configuration file 322 does not exist.

At step 204, a configuration file is provided from immutable BMC hardware in the programming-enhanced BMC to the PLD based at least on the programming-enhanced BMC being powered on. The configuration file specifies a configuration to be programmatically applied to programmable hardware of the PLD. The configuration file may be an image of the PLD and/or an update to the PLD. An image of a PLD includes software that is executable by the PLD to program programmable hardware in the PLD. An update to a PLD specifies changes that are to be made to a current configuration of programmable hardware in the PLD to result in an updated configuration of the programmable hardware. In an aspect, providing the configuration file from the immutable BMC hardware to the PLD at step 204 reduces an amount of time and/or resources (e.g., processor cycles and/or memory) that is consumed to perform system management operations with regard to a computing device that includes the programming-enhanced BMC. By reducing the amount of time and/or resources that is consumed, efficiency of the computing device may be increased. In an example implementation, the immutable BMC hardware 308 provides a configuration file 326 to the PLD 310 based at least on the programming-enhanced BMC 300 being powered on. In accordance with this implementation, the configuration file 326 specifies a configuration to be programmatically applied to the programmable hardware 320 of the PLD 310.

At step 206, the programmable hardware of the PLD is programmed by loading the configuration file, which causes the programmable hardware to render (e.g., instantiate) a peripheral interface that is defined by the configuration file natively on the internal bus of the programming-enhanced BMC. Accordingly, in as aspect, loading the configuration file results in the programmable hardware rendering the peripheral interface natively on the internal bus of the programming-enhanced BMC. In an aspect, causing the programmable hardware to render the peripheral interface that is defined by the configuration file natively on the internal bus of the programming-enhanced BMC reduces cost of a motherboard to which the programming-enhanced BMC is coupled (and therefore a computing device that includes the programming-enhanced BMC), for example, by obviating a need to convert signals from a protocol of the programming-enhanced BMC to protocols of the motherboard and peripheral device(s) that are monitored by the programming-enhanced BMC. In another aspect, causing the programmable hardware to render the peripheral interface natively on the internal bus of the programming-enhanced BMC reduces an amount of time and/or resources (e.g., processor cycles and/or memory) that is consumed to perform system management operations with regard to a computing device that includes the programming-enhanced BMC. By reducing the amount of time and/or resources that is consumed, efficiency of the computing device may be increased.

In an example implementation, the PLD 310 programs the programmable hardware 320 therein by loading the configuration file 326. By loading the configuration file 326, the PLD 310 causes the programmable hardware 320 to render the programmed peripheral interface 316, which is defined by the configuration file 326, natively on the internal bus 314. For example, by causing the programmed peripheral interface 316 to be rendered natively on the internal bus 314, the PLD 310 may cause the immutable BMC hardware 308 to treat the programmed peripheral interface 316 in the same manner as the immutable BMC hardware 308 treats the immutable peripheral interface(s) 312. In accordance with this example, the immutable BMC hardware 308 may not be capable of determining (e.g., distinguishing) whether the programmed peripheral interface 316 is programmed or immutable. In an aspect of this implementation, the programmed peripheral interface 316 is an interface between the immutable BMC hardware 308 and a peripheral device that is associated with a particular protocol. Accordingly, the programmed peripheral interface 316 may be specific to the particular protocol. Examples of a protocol that may be associated with the peripheral device include but are not limited to a universal serial bus (USB) protocol, developed by Compaq Computer Corporation, Digital Equipment Corporation (DEC), International Business Machines Corporation (IBM), Intel Corporation, Microsoft Corporation, NEC Corporation, and Nortel Networks Corporation; an inter-integrated circuit (I2C) protocol, developed by Philips Semiconductors (now NXP Semiconductors); an I3C protocol, developed by MIPI Alliance; a personal computer memory card international association (PCMCIA) protocol (a.k.a. a PC card protocol), developed by PCMCIA; a serial peripheral interface (SPI) protocol, developed by Motorola, Inc.; an Ethernet protocol, developed by Xerox PARC (now Palo Alto Research Center (PARC)); and a peripheral component interconnect express (PCIe) protocol, developed by Intel Corporation, Dell Inc., HP Inc., and IBM.

In an example embodiment, loading the configuration file at step 206 includes creating a register definition that defines the peripheral interface. In an example implementation, the PLD 310 loads the configuration file 322 by creating a register definition that defines the programmed peripheral interface 316. In accordance with this embodiment, programming the programmable hardware of the PLD at step 206 causes the register definition to be rendered natively on the internal bus of the programming-enhanced BMC to provide the peripheral interface. In an example implementation, by programming the programmable hardware 320, the PLD 310 causes the register definition to be rendered natively on the internal bus 314 to provide the programmed peripheral interface 316. In an aspect, the PLD 310 programs the programmable hardware 320 to have the configuration that is specified by the configuration file 322 by loading the configuration file 322. In accordance with this aspect, by programming the programmable hardware 320 in this manner, the PLD 310 generates the register definition based on a definition of the register definition that is included in the configuration file 322. In further accordance with this aspect, rendering the programmable peripheral interface 316 on the internal bus 314 includes rendering the register definition on the internal bus 314.

In another example embodiment, programming the programmable hardware of the PLD at step 206 causes an operating system (OS) that executes on the programming-enhanced BMC to detect the peripheral interface natively. In an aspect, the OS is a Linux-embedded OS. In an example implementation, by programming the programmable hardware 320, the PLD 310 causes an operating system (OS) 328 that executes on the programming-enhanced BMC 308 to detect the programmed peripheral interface 316 natively.

In some example embodiments, one or more steps 202, 204, and/or 206 of flowchart 200 are not performed. Moreover, steps in addition to or in lieu of steps 202, 204, and/or 206 may be performed. For instance, in an example embodiment, the method of flowchart 200 further includes providing packets, which are formatted in accordance with a protocol that is associated with the peripheral interface, from the immutable BMC hardware to a peripheral device via the peripheral interface. In an example implementation, the immutable BMC hardware 308 provides first packets 330, which are formatted in accordance with a protocol that is associated with the programmed peripheral interface 316, to a peripheral device via the programmed peripheral interface 316. In an aspect of this implementation, the immutable BMC hardware 308 natively uses a driver associated with the protocol to generate the first packets 330. By natively using the driver associated with the protocol, it is meant that the immutable BMC hardware 308 uses the driver to generate the first packets 330 similarly to a manner in which the immutable BMC hardware 308 uses driver(s) associated with protocol(s) that are associated with the immutable peripheral interface(s) 312 to generate second packets 332. In an aspect, the protocol being associated with a peripheral interface that is programmed rather than immutable is inconsequential (e.g., irrelevant) with regard to how the immutable BMC hardware 108 interacts with (e.g., uses) the driver.

In an aspect of this embodiment, the packets, which are formatted in accordance with the protocol that is associated with the peripheral interface, are provided from the immutable BMC hardware to the peripheral device via the peripheral interface without the packets being converted (e.g., level-shifted or translated) to another protocol in transit to the peripheral device. In an example implementation, the immutable BMC hardware 308 provides the first packets 330 to the peripheral device via the programmed peripheral interface 316 without the first packets 330 being converted to another protocol, which is different from the protocol that is associated with the programmed peripheral interface 316, in transit to the peripheral device.

It will be recognized that the programming-enhanced BMC 300 need not necessarily include the immutable peripheral interface(s) 312 and/or the store 318. Furthermore, the programming-enhanced BMC 300 may include components in addition to or in lieu of the immutable BMC hardware 308, the PLD 310, the immutable peripheral interface(s) 312, the internal bus 314, and/or the store 318.

Figure 4:
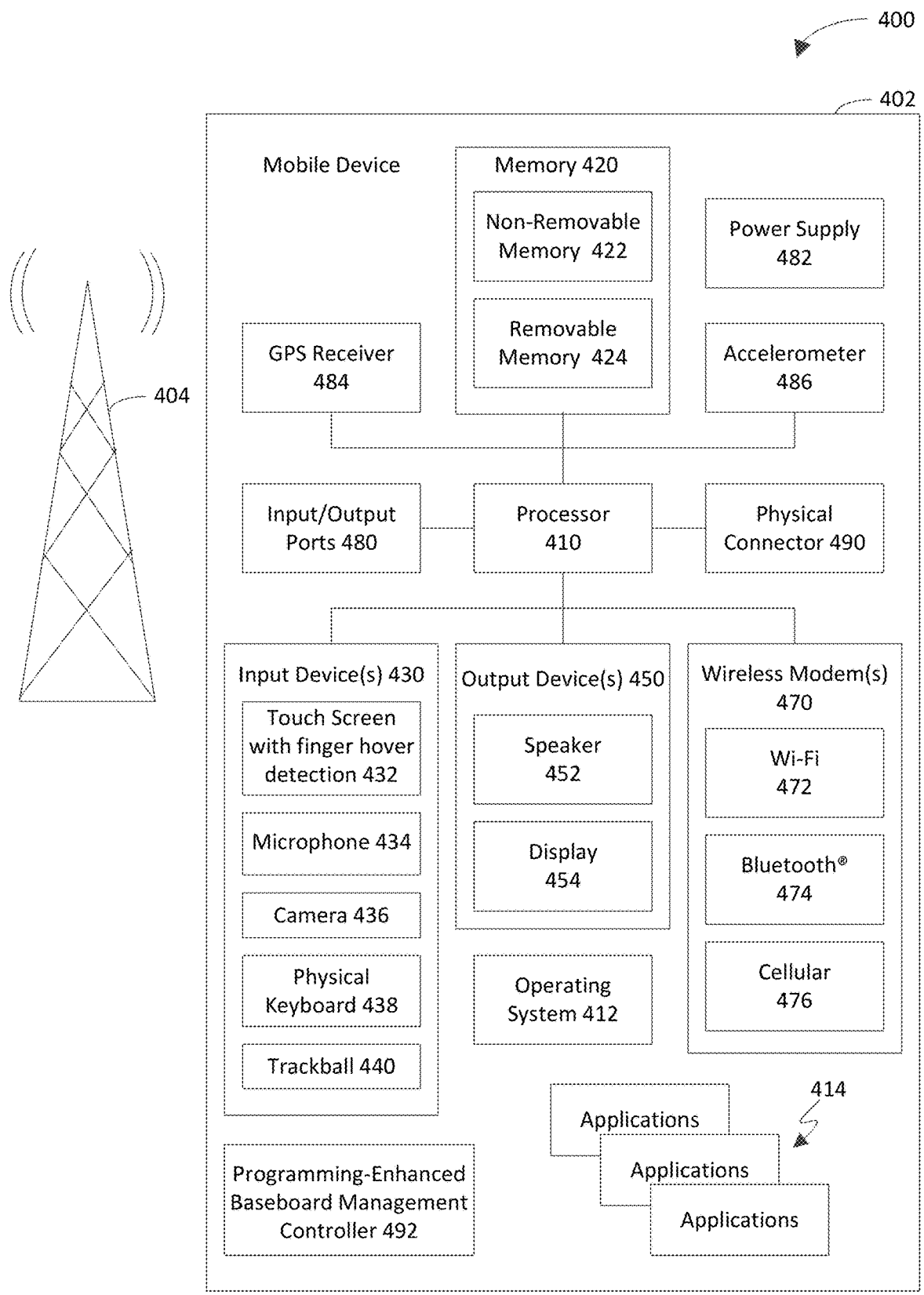
FIG. 4 is a system diagram of an example mobile device in accordance with an embodiment.

FIG. 4 is a system diagram of an example mobile device 400 including a variety of optional hardware and software components, shown generally as 402. Any components 402 in the mobile device may communicate with any other component, though not all connections are shown, for ease of illustration. The mobile device 400 may be any of a variety of computing devices (e.g., cell phone, smartphone, handheld computer, Personal Digital Assistant (PDA), etc.) and may allow wireless two-way communications with one or more mobile communications networks 404, such as a cellular or satellite network, or with a local area or wide area network.

The mobile device 400 includes a processor 410 (e.g., signal processor, microprocessor, ASIC, or other control and processing logic circuitry) for performing such tasks as signal coding, data processing, input/output processing, power control, and/or other functions. An operating system 412 may control the allocation and usage of the components 402 and support for one or more applications 414 (a.k.a. application programs). The applications 414 may include common mobile computing applications (e.g., email applications, calendars, contact managers, web browsers, messaging applications) and any other computing applications (e.g., word processing applications, mapping applications, media player applications).

The mobile device 400 includes programming-enhanced baseboard management controller (BMC) 492, which is operable in a manner similar to the programming-enhanced BMC 104 described above with reference to FIG. 1 and/or the programming-enhanced BMC 300 described above with reference to FIG. 3.

The mobile device 400 includes memory 420. The memory 420 may include non-removable memory 422 and/or removable memory 424. The non-removable memory 422 may include random access memory (RAM), read-only memory (ROM), flash memory, a hard disk, or other well-known memory storage technologies. The removable memory 424 may include flash memory or a Subscriber Identity Module (SIM) card, which is well known in Global System for Mobile Communications (GSM) systems, or other well-known memory storage technologies, such as "smart cards." The memory 420 may store data and/or code for running the operating system 412 and the applications 414. Example data may include web pages, text, images, sound files, video data, or other data sets to be sent to and/or received from one or more network servers or other devices via one or more wired or wireless networks. Memory 420 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 400 may support one or more input devices 430, such as a touch screen 432, microphone 434, camera 436, physical keyboard 438 and/or trackball 440 and one or more output devices 450, such as a speaker 452 and a display 454. Touch screens, such as the touch screen 432, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 432 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 432 and display 454 may be combined in a single input/output device. The input devices 430 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 412 or applications 414 may include speech-recognition software as part of a voice control interface that allows a user to operate the mobile device 400 via voice commands. Furthermore, the mobile device 400 may include input devices and software that allows for user interaction via a user's spatial gestures, such as detecting and interpreting gestures to provide input to a gaming application.

Wireless modem(s) 470 may be coupled to antenna(s) (not shown) and may support two-way communications between the processor 410 and external devices, as is well understood in the art. The modem(s) 470 are shown generically and may include a cellular modem 476 for communicating with the mobile communication network 404 and/or other radio-based modems (e.g., Bluetooth® 474 and/or Wi-Fi 472). At least one of the wireless modem(s) 470 is typically configured for communication with one or more cellular networks, such as a GSM network for data and voice communications within a single cellular network, between cellular networks, or between the mobile device and a public switched telephone network (PSTN).

The mobile device 400 may further include at least one input/output port 480, a power supply 482, a satellite navigation system receiver 484, such as a Global Positioning System (GPS) receiver, an accelerometer 486, and/or a physical connector 490, which may be a universal serial bus (USB) port, IEEE 1394 (FireWire) port, and/or RS-232 port. The illustrated components 402 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

II. Further Discussion of Some Example Embodiments (A1) An example programming-enhanced baseboard management controller (BMC) (FIG. 1, 104; FIG. 3, 300; FIG. 4, 492) comprising: immutable BMC hardware (FIG. 1, 108; FIG. 3, 308), an internal bus (FIG. 1, 114; FIG. 3, 314), and a programmable logic device (PLD) (FIG. 1, 110; FIG. 3, 310). The immutable BMC hardware is configured to perform a system management operation with regard to a peripheral device (FIG. 1, 106) that is external to the programming-enhanced BMC. The PLD is coupled to the internal bus. The PLD is configured to power on (FIG. 2, 202) the programming-enhanced BMC. The immutable BMC hardware is configured to provide (FIG. 2, 204) a configuration file (FIG. 3, 326) to the PLD based at least on the programming-enhanced BMC being powered on. The configuration file specifies a configuration to be programmatically applied to programmable hardware (FIG. 3, 320) of the PLD. The PLD is further configured to program (FIG. 2, 206) the programmable hardware of the PLD by loading the configuration file, which causes the programmable hardware to render a peripheral interface (FIG. 1, 116; FIG. 3, 316) that is defined by the configuration file natively on the internal bus of the programming-enhanced BMC.

(A2) In the example programming-enhanced BMC of A1, wherein the PLD is configured to power on the programming-enhanced BMC despite an initial configuration file, which defines an initial configuration to be applied to the PLD prior to the programming-enhanced BMC being powered on, being corrupted.

(A3) In the example programming-enhanced BMC of any of A1-A2, wherein the PLD is configured to power on the programming-enhanced BMC despite the PLD not having access to an initial configuration file, which defines an initial configuration to be applied to the PLD prior to the programming-enhanced BMC being powered on.

(A4) In the example programming-enhanced BMC of any of A1-A3, wherein the immutable BMC hardware is configured to provide packets, which are formatted in accordance with a protocol that is associated with the peripheral interface, via the peripheral interface.

(A5) In the example programming-enhanced BMC of any of A1-A4, wherein the immutable BMC hardware is configured to provide the packets, which are formatted in accordance with the protocol, without the packets being converted to another protocol.

(A6) In the example programming-enhanced BMC of any of A1-A5, wherein the PLD is configured to load the configuration file by creating a register definition that defines the peripheral interface; and wherein the programmable hardware is configured to render the register definition natively on the internal bus of the programming-enhanced BMC to provide the peripheral interface.

(A7) In the example programming-enhanced BMC of any of A1-A6, wherein the PLD causes an operating system (OS) that executes on the programming-enhanced BMC to detect the peripheral interface natively by loading the configuration file.

(B1) An example method comprises powering (FIG. 2, 202) on a programming-enhanced baseboard management controller (BMC) (FIG. 1, 104; FIG. 3, 300; FIG. 4, 492) by a programmable logic device (PLD) (FIG. 1, 110; FIG. 3, 310) that is integrated into the programming-enhanced BMC and that is coupled to an internal bus (FIG. 1, 114; FIG. 3, 314) of the programming-enhanced BMC. The method further comprises providing (FIG. 2, 204) a configuration file (FIG. 3, 326) from immutable BMC hardware (FIG. 1, 108; FIG. 3, 308) in the BMC to the PLD based at least on the programming-enhanced BMC being powered on. The configuration file specifies a configuration to be programmatically applied to programmable hardware (FIG. 3, 320) of the PLD. The method further comprises programming (FIG. 2, 206) the programmable hardware of the PLD by loading the configuration file, which causes the programmable hardware to render a peripheral interface (FIG. 1, 116; FIG. 3, 316) that is defined by the configuration file natively on the internal bus of the programming-enhanced BMC.

(B2) In the example method of B1, wherein powering on the programming-enhanced BMC comprises: performing, by the PLD, a power-on sequence in which the PLD powers on the programming-enhanced BMC despite an initial configuration file, which defines an initial configuration that is to be applied to the PLD during the power-on sequence, being corrupted.

(B3) In the example method of any of B1-B2, wherein powering on the programming-enhanced BMC comprises: performing, by the PLD, a power-on sequence in which the PLD powers on the programming-enhanced BMC despite not having access to an initial configuration file that defines an initial configuration that is to be applied to the PLD during the power-on sequence.

(B4) In the example method of any of B1-B3, further comprising: providing packets, which are formatted in accordance with a protocol that is associated with the peripheral interface, from the immutable BMC hardware to a peripheral device via the peripheral interface.

(B5) In the example method of any of B1-B4, wherein providing the packets comprises: providing the packets, which are formatted in accordance with the protocol that is associated with the peripheral interface, from the immutable BMC hardware to the peripheral device via the peripheral interface without the packets being converted to another protocol in transit to the peripheral device.

(B6) In the example method of any of B1-B5, wherein loading the configuration file comprises: loading the configuration file by creating a register definition that defines the peripheral interface; and wherein programming the programmable hardware of the PLD causes the register definition to be rendered natively on the internal bus of the programming-enhanced BMC to provide the peripheral interface.

(B7) In the example method of any of B1-B6, wherein programming the programmable hardware of the PLD causes an operating system (OS) that executes on the programming-enhanced BMC to detect the peripheral interface natively.

Figure 5:
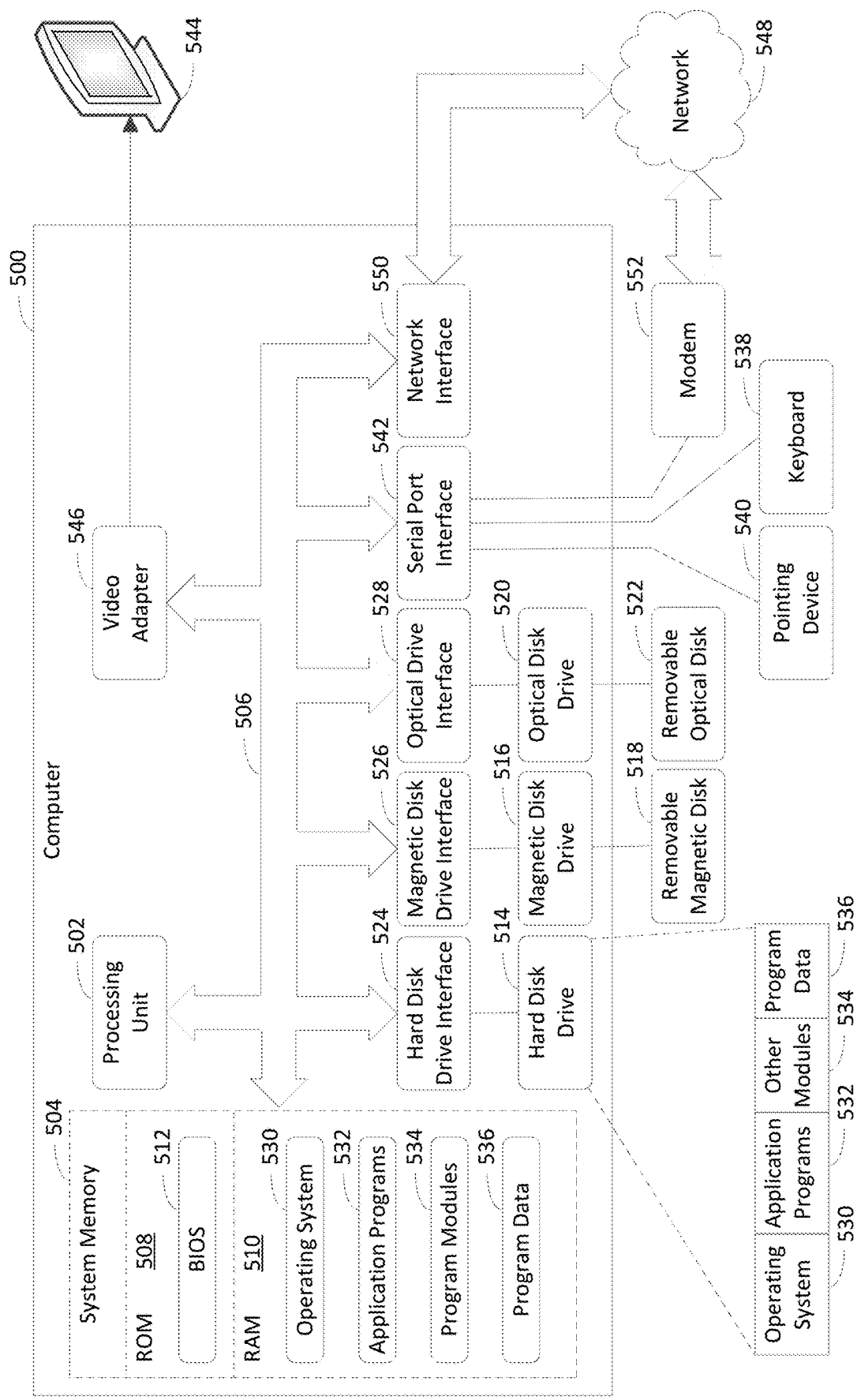
FIG. 5 depicts an example computer in which embodiments may be implemented.

(C1) An example computing system (FIG. 1, 100; FIG. 4, 402; FIG. 5, 500) comprises memory (FIG. 4, 420, 422, 424; FIG. 5, 504), a processing system (FIG. 4, 410; FIG. 5, 502) coupled to the memory, and a programming-enhanced baseboard management controller (BMC) (FIG. 1, 104; FIG. 3, 300; FIG. 4, 492). The programming-enhanced BMC comprises: an internal bus (FIG. 1, 114; FIG. 3, 314), an immutable peripheral interface (FIG. 1, 112; FIG. 3, 312) coupled to the internal bus, immutable BMC hardware (FIG. 1, 108; FIG. 3, 308), and a programmable logic device (PLD) (FIG. 1, 110; FIG. 3, 310). The immutable BMC hardware is configured to perform a system management operation with regard to a peripheral device (FIG. 1, 106), which includes the memory or the processing system, by providing packets (FIG. 3, 332) to the peripheral device via the immutable peripheral interface. The PLD is coupled to the internal bus. The PLD is configured to power on the programming-enhanced BMC. The PLD includes programmable hardware (FIG. 3, 320). The immutable BMC hardware is further configured to provide a configuration file (FIG. 3, 326) to the PLD based at least on the programming-enhanced BMC being powered on. The configuration file specifies a configuration to be programmatically applied to the programmable hardware of the PLD. The PLD is further configured to provide a programmed peripheral interface (FIG. 1, 116; FIG. 3, 316) natively on the internal bus of the programming-enhanced BMC by programming the programmable hardware of the PLD using the configuration file.

(C2) In the example computing system of C1, wherein the PLD is configured to perform a power-on sequence in which the PLD powers on the programming-enhanced BMC despite an initial configuration file, which defines an initial configuration that is to be applied to the PLD during the power-on sequence, being corrupted.

(C3) In the example computing system of any of C1-C2, wherein the PLD is configured to perform a power-on sequence in which the PLD powers on the programming-enhanced BMC despite not having access to an initial configuration file that defines an initial configuration that is to be applied to the PLD during the power-on sequence.

(C4) In the example computing system of any of C1-C3, wherein the immutable BMC hardware is configured to provide packets, which are formatted in accordance with a protocol that is associated with the programmed peripheral interface, via the programmed peripheral interface.

(C5) In the example computing system of any of C1-C4, wherein the immutable BMC hardware is configured to provide the packets, which are formatted in accordance with the protocol, without the packets being converted to another protocol.

(C6) In the example computing system of any of C1-C5, wherein the PLD is configured to program the programmable hardware of the PLD by creating a register definition that defines the peripheral interface using the configuration file; and wherein the programmable hardware is configured to render the register definition natively on the internal bus of the programming-enhanced BMC to provide the programmed peripheral interface.

(C7) In the example computing system of any of C1-C6, wherein the PLD causes an operating system (OS) that executes on the programming-enhanced BMC to detect the programmed peripheral interface natively.

III. Example Computer System

FIG. 5 depicts an example computer 500 in which embodiments may be implemented. The computing system 100 shown in FIG. 1 may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system (BIOS) 512 is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing any one or more of (e.g., at least a portion of) the programmable logic device 110, the programmed peripheral interface 116, one or more of the peripheral devices 106, the programmable logic device 310, the programmed peripheral interface 316, and/or flowchart 200 (including any step of flowchart 200), as described herein.

A user may enter commands and information into the computer 500 through input devices such as keyboard 538 and pointing device 540. Other input devices (not shown) may include a microphone, joystick, game pad, satellite dish, scanner, touch screen, camera, accelerometer, gyroscope, or the like. These and other input devices are often connected to the processing unit 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface or adapter 550, a modem 552, or other means for establishing communications over the network. Modem 552, which may be internal or external, is connected to bus 506 via serial port interface 542.

As used herein, the terms "computer program medium" and "computer-readable storage medium" are used to generally refer to media (e.g., non-transitory media) such as the hard disk associated with hard disk drive 514, removable magnetic disk 518, removable optical disk 522, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate example embodiments of the present disclosure. However, the scope of the present disclosure is not limited to these embodiments, but is instead defined by the appended claims. Thus, embodiments beyond those shown in the accompanying drawings, such as modified versions of the illustrated embodiments, may nevertheless be encompassed by the present disclosure.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first," "second," and "third" are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A programming-enhanced baseboard management controller (BMC) comprising:

immutable BMC hardware configured to perform a system management operation with regard to a peripheral device that is external to the programming-enhanced BMC;
an internal bus; and
a programmable logic device (PLD) coupled to the internal bus, the PLD configured to power on the programming-enhanced BMC;
wherein the immutable BMC hardware is configured to provide a configuration file to the PLD based at least on the programming-enhanced BMC being powered on, the configuration file specifying a configuration to be programmatically applied to programmable hardware of the PLD; and
wherein the PLD is further configured to program the programmable hardware of the PLD by loading the configuration file, which causes the programmable hardware to render a peripheral interface that is defined by the configuration file natively on the internal bus of the programming-enhanced BMC.

2. The programming-enhanced BMC of claim 1, wherein the PLD is configured to power on the programming-enhanced BMC despite an initial configuration file, which defines an initial configuration to be applied to the PLD prior to the programming-enhanced BMC being powered on, being corrupted.

3. The programming-enhanced BMC of claim 1, wherein the PLD is configured to power on the programming-enhanced BMC despite the PLD not having access to an initial configuration file, which defines an initial configuration to be applied to the PLD prior to the programming-enhanced BMC being powered on.

4. The programming-enhanced BMC of claim 1, wherein the immutable BMC hardware is configured to provide packets, which are formatted in accordance with a protocol that is associated with the peripheral interface, via the peripheral interface.

5. The programming-enhanced BMC of claim 4, wherein the immutable BMC hardware is configured to provide the packets, which are formatted in accordance with the protocol, without the packets being converted to another protocol.

6. The programming-enhanced BMC of claim 1, wherein the PLD is configured to load the configuration file by creating a register definition that defines the peripheral interface; and
wherein the programmable hardware is configured to render the register definition natively on the internal bus of the programming-enhanced BMC to provide the peripheral interface.

7. The programming-enhanced BMC of claim 1, wherein the PLD causes an operating system (OS) that executes on the programming-enhanced BMC to detect the peripheral interface natively by loading the configuration file.

8. A method comprising:
powering on a programming-enhanced baseboard management controller (BMC) by a programmable logic device (PLD) that is integrated into the programming-enhanced BMC and that is coupled to an internal bus of the programming-enhanced BMC;
providing a configuration file from immutable BMC hardware in the programming-enhanced BMC to the PLD based at least on the programming-enhanced BMC being powered on, the configuration file specifying a configuration to be programmatically applied to programmable hardware of the PLD; and
programming the programmable hardware of the PLD by loading the configuration file, which causes the programmable hardware to render a peripheral interface that is defined by the configuration file natively on the internal bus of the programming-enhanced BMC.

9. The method of claim 8, wherein powering on the programming-enhanced BMC comprises:
performing, by the PLD, a power-on sequence in which the PLD powers on the programming-enhanced BMC despite an initial configuration file, which defines an initial configuration that is to be applied to the PLD during the power-on sequence, being corrupted.

10. The method of claim 8, wherein powering on the programming-enhanced BMC comprises:
performing, by the PLD, a power-on sequence in which the PLD powers on the programming-enhanced BMC despite not having access to an initial configuration file that defines an initial configuration that is to be applied to the PLD during the power-on sequence.

11. The method of claim 8, further comprising:
providing packets, which are formatted in accordance with a protocol that is associated with the peripheral interface, from the immutable BMC hardware to a peripheral device via the peripheral interface.

12. The method of claim 11, wherein providing the packets comprises:
providing the packets, which are formatted in accordance with the protocol that is associated with the peripheral interface, from the immutable BMC hardware to the peripheral device via the peripheral interface without the packets being converted to another protocol in transit to the peripheral device.

13. The method of claim 8, wherein loading the configuration file comprises:
loading the configuration file by creating a register definition that defines the peripheral interface; and
wherein programming the programmable hardware of the PLD causes the register definition to be rendered natively on the internal bus of the programming-enhanced BMC to provide the peripheral interface.

14. The method of claim 8, wherein programming the programmable hardware of the PLD causes an operating system (OS) that executes on the programming-enhanced BMC to detect the peripheral interface natively.

15. A computing system comprising:
memory;
a processing system coupled to the memory; and
a programming-enhanced baseboard management controller (BMC) comprising:
an internal bus;
an immutable peripheral interface coupled to the internal bus;
immutable BMC hardware configured to perform a system management operation with regard to a peripheral device, which includes the memory or the processing system, by providing packets to the peripheral device via the immutable peripheral interface; and
a programmable logic device (PLD) coupled to the internal bus, the PLD configured to power on the programming-enhanced BMC, the PLD including programmable hardware;
wherein the immutable BMC hardware is further configured to provide a configuration file to the PLD based at least on the programming-enhanced BMC being powered on, the configuration file specifying a configuration to be programmatically applied to the programmable hardware of the PLD; and wherein the PLD is further configured to provide a programmed peripheral interface natively on the internal bus of the programming-enhanced BMC by programming the programmable hardware of the PLD using the configuration file.

16. The computing system of claim 15, wherein the PLD is configured to perform a power-on sequence in which the PLD powers on the programming-enhanced BMC despite an initial configuration file, which defines an initial configuration that is to be applied to the PLD during the power-on sequence, being corrupted.

17. The computing system of claim 15, wherein the PLD is configured to perform a power-on sequence in which the PLD powers on the programming-enhanced BMC despite not having access to an initial configuration file that defines an initial configuration that is to be applied to the PLD during the power-on sequence.

18. The computing system of claim 15, wherein the immutable BMC hardware is configured to provide packets, which are formatted in accordance with a protocol that is associated with the programmed peripheral interface, via the programmed peripheral interface.

19. The computing system of claim 18, wherein the immutable BMC hardware is configured to provide the packets, which are formatted in accordance with the protocol, without the packets being converted to another protocol.

20. The computing system of claim 15, wherein the PLD is configured to program the programmable hardware of the PLD by creating a register definition that defines the peripheral interface using the configuration file; and wherein the programmable hardware is configured to render the register definition natively on the internal bus of the programming-enhanced BMC to provide the programmed peripheral interface.

* * * * *